(12) United States Patent
Zeng (10) Patent No.: US 8,948,453 B2
(45) Date of Patent: Feb. 3, 2015

(54) DEVICE, METHOD AND NON-TRANSITORY COMPUTER READABLE STORAGE MEDIUM FOR DETECTING OBJECT

(71) Applicant: Institute for Information Industry, Taipei (TW)

(72) Inventor: Yi-Chong Zeng, Keelung (TW)

(73) Assignee: Institute for Information Industry, Taipei (TW)

( * ) Notice: Subject to any disclaimer, the term of this patent is extended or adjusted under 35 U.S.C. 154(b) by 218 days.

(21) Appl. No.: 13/716,220

(22) Filed: Dec. 17, 2012

(65) Prior Publication Data

US 2014/0146999 A1     May 29, 2014

(30) Foreign Application Priority Data

Nov. 23, 2012   (TW) .............................. 101144012 A (51) Int. Cl.
*G06K 9/00*          (2006.01)
(52) U.S. Cl.
CPC .................................. *G06K 9/00624* (2013.01)
USPC .......................................................... 382/103
(58) Field of Classification Search
CPC ................................................. G06K 9/00624
USPC ......................................................... 382/103
See application file for complete search history.

(56) References Cited

U.S. PATENT DOCUMENTS

| | | | |
|---|---|---|---|
| 6,959,117 B2 | 10/2005 | Ratner et al. | |
| 7,302,096 B2 | 11/2007 | Kim | |
| 2009/0309966 A1* | 12/2009 | Chen et al. ..................... | 348/135 |
| 2010/0271502 A1* | 10/2010 | Phelippeau et al. ........ | 348/222.1 |
| 2010/0284606 A1* | 11/2010 | Kao .............................. | 382/154 |
| 2010/0290710 A1* | 11/2010 | Gagvani et al. ............... | 382/224 |
| 2011/0091073 A1* | 4/2011 | Iwasaki et al. ................ | 382/103 |
| 2011/0317919 A1* | 12/2011 | Wong et al. ................... | 382/168 |
| 2012/0154579 A1* | 6/2012 | Hampapur et al. ........... | 348/143 |

* cited by examiner

*Primary Examiner* — Stephen R Koziol
*Assistant Examiner* — Delomia Gilliard
(74) *Attorney, Agent, or Firm* — CKC & Partners Co., Ltd.

(57) ABSTRACT

A method for detecting objects is provided. The method comprises the steps outlined below. An image having pixels is acquired. Image blocks each corresponding to one of the pixels are generated. A specific image block is filtered using N filtering parameters that gradually enhance the blurriness of the specific image block to generate N filtering results. N RMSE values are computed, in which the M-th RMSE value is computed according to the M-th and the (M−1)-th filtering results. A slope of an approximate line is computed according to the RMSE values as the blurriness value of the specific image block. The above steps are repeated to generate the blurriness values of all the pixels. The blurriness value is compared to a threshold value to detect sharp pixels which are parts of a sharp object and further detect an in-focus object.

21 Claims, 7 Drawing Sheets

DEVICE, METHOD AND NON-TRANSITORY COMPUTER READABLE STORAGE MEDIUM FOR DETECTING OBJECT

RELATED APPLICATIONS

The present application is based on, and claims priority from, Taiwan Application Serial Number 101144012, filed on Nov. 23, 2012, the disclosure of which is hereby incorporated by reference herein in its entirety.

BACKGROUND

1. Technical Field

The present invention relates to an object detection technology. More particularly, the present invention relates to a device, a method and a non-transitory computer readable storage medium for detecting object.

2. Description of Related Art

Common photographic devices are not equipped with the function of depth detecting. Hence, these devices are not able to obtain the depth information from the photographic result. In such devices, the depth has to be estimated by additional depth detecting device or by using methods of digital image processing. The object in the photographic result that is on a specific distance is detected by using the depth information or other substitutive information subsequently.

When the object is located on the focal point of the photographic devices, the object is clearly shown in the retrieved image. If the object deviates from the focal point, a blurry shape of the object is obtained. Accordingly, the relation between the blurriness of the photographed object and the focal point related parameters is close. Further, the blurriness of the photographed object is also related to the degree of the depth. In digital image processing technology, the edge is used as a reference index. The object can be detected by computing a degree of blurriness of the edge of the object. In conventional technologies, the blurriness of the edge is determined by the width of the edge or by the difference between the inside pixels and outside pixels of the edge. However, these technologies are sensitive to the change of the light source in which the computed blurriness value varies accordingly. The detection result of the object is not able to be steady and accurate.

Accordingly, what is need is a device, a method and a non-transitory computer readable storage medium for detecting objects that can compute the blurriness values of the pixels without being affected by the changing light source to further detect the sharp object with accuracy.

SUMMARY

An object of the present invention is to provide a method for detecting objects used in a device for detecting objects. The method comprises the steps outlined below. An image having pixels is acquired. A plurality of image blocks are generated, in which each of the image blocks corresponds to one of the pixels. A specific image block is filtered using N filtering parameters to generate N filtering results, in which the N filtering parameters gradually enhance the blurriness of the specific image block. N root mean square error (RMSE) values are computed, in which the M-th RMSE value is computed according to the M-th and the (M−1)-th filtering results. A slope of an approximate line is computed according to the RMSE values as the blurriness value of the specific image block. The above steps are repeated to generate the blurriness values of all of the image blocks correspond to the pixels. The blurriness value of each of the image blocks is compared with a threshold value to detect corresponding pixels which are parts of a sharp object and further detect an in-focus object.

Another object of the present invention is to provide a device for detecting objects. The device comprises an image acquiring module, an image transforming module and an in-focus object detecting module. The image acquiring module acquires an image having pixels and generating a plurality of image blocks, in which each of the image blocks corresponds to one of the pixels. The image transforming module comprises N filtering units, N RMSE computing units and a slope computing unit. The N filtering units has N corresponding filtering parameters for filtering a specific image block of the image blocks to generate N filtering results, in which the N filtering parameters gradually enhance the blurriness of the specific image block. The N RMSE computing units compute N RMSE values, in which the M-th RMSE value is computed according to the M-th and the (M−1)-th filtering results. The slope computing unit computes a slope of an approximate line according to the RMSE values as the blurriness value of the specific image block. The in-focus object detecting module for comparing the blurriness value of each of the image blocks with a threshold value to detect corresponding pixels which are parts of a sharp object and further detect an in-focus object.

Yet another object of the present invention is to provide a non-transitory computer readable storage medium to store a computer program to execute a method for detecting objects used in a device for detecting objects. The method comprises the steps outlined below. An image having pixels is acquired. A plurality of image blocks are generated, in which each of the image blocks corresponds to one of the pixels. A specific image block is filtered using N filtering parameters to generate N filtering results, in which the N filtering parameters gradually enhance the blurriness of the specific image block. N root mean square error (RMSE) values are computed, in which the M-th RMSE value is computed according to the M-th and the (M−1)-th filtering results. A slope of an approximate line is computed according to the RMSE values as the blurriness value of the specific image block. The above steps are repeated to generate the blurriness values of all of the image blocks correspond to the pixels. The blurriness value of each of the image blocks is compared with a threshold value to detect corresponding pixels which are parts of a sharp object and further detect an in-focus object.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
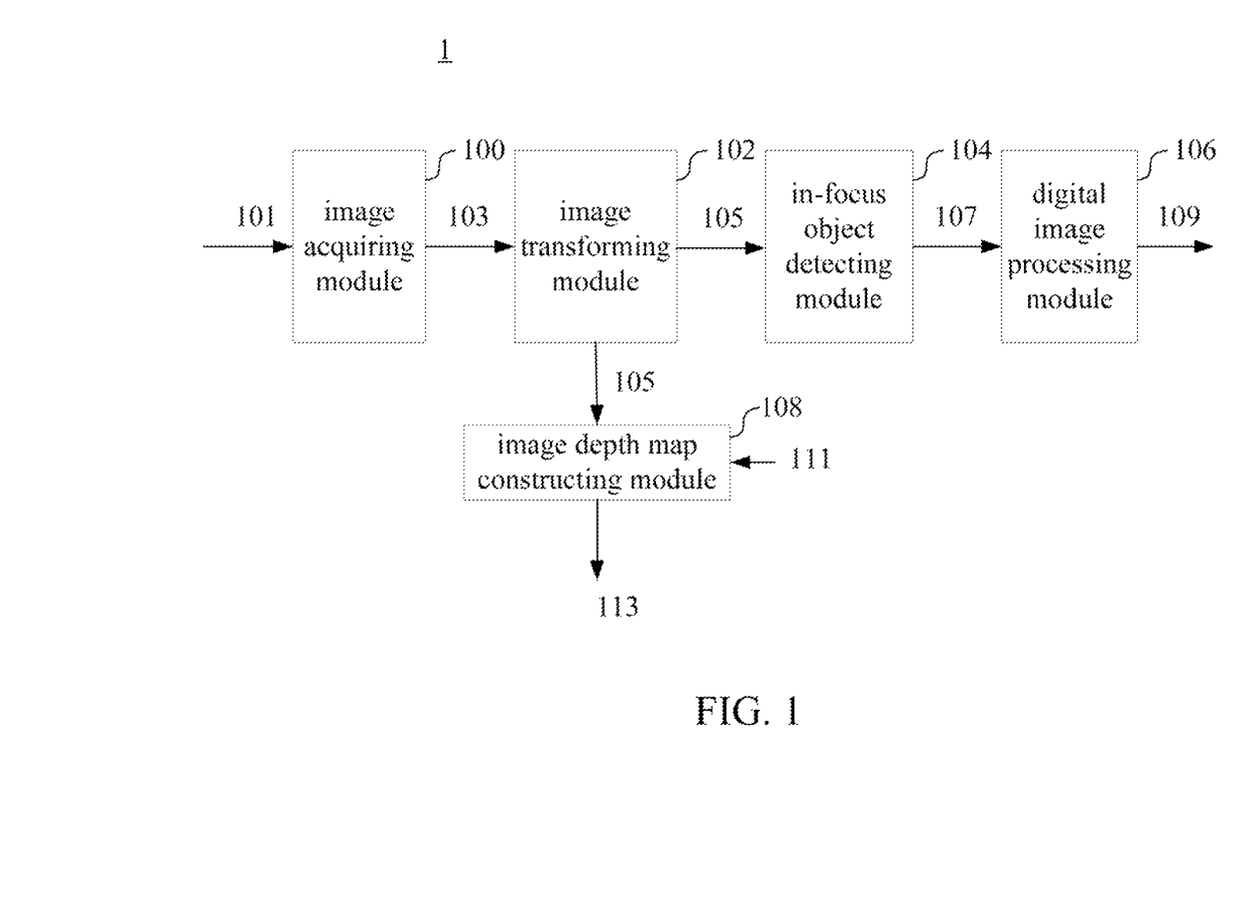
FIG. 1 is a block diagram of a device for detecting objects in an embodiment of the present invention.

FIG. 1 is a block diagram of a device 1 for detecting objects in an embodiment of the present invention. The device 1 comprises an image acquiring module 100, an image transforming module 102, an in-focus object detecting module 104, a digital image processing module 106 and an image depth map constructing module 108.

The image acquiring module 100 acquires an image having pixels 101. In the present embodiment, the image 101 is a still image. The image acquiring module 100 further generating a plurality of image blocks 103, in which each of the image blocks 103 corresponds to one of the pixels. The image transforming module 102 generates blurriness values 105 each corresponding to one of the image blocks 103 after performing filtering and computing processes on the image blocks 103.

The in-focus object detecting module 104 compares the blurriness values 105 of the pixels of the image 101 with a threshold value. In different embodiments, the threshold value can be either a fixed threshold value or an adaptive threshold value. In the present embodiment, the image tends to be sharp when the blurriness value is small and tends to be blurry when the blurriness value is large. Therefore, after the comparison, the in-focus object detecting module 104 can detect the sharp object in the image 101. In the present embodiment, since the image 101 is a still image, the detected sharp object is the in-focus object 107. The digital image processing module 106 further performs image processing on the in-focus object 107 to generate the final in-focus object processed result 109.

Figure 2:
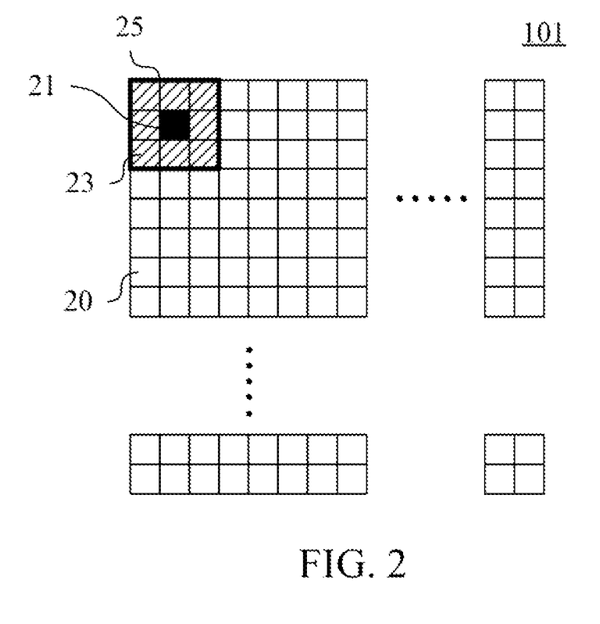
FIG. 2 is a diagram depicting an image in an embodiment of the present invention.

The steps of the object detecting process are described in detail in the subsequent paragraphs. At first, FIG. 2 is a diagram depicting the image 101 acquired by the image acquiring module 100.

The image 101 acquired by the image acquiring module 100 comprises a plurality of pixels 20. In an embodiment, any one of the image blocks 103 is a window 25 having the size W×H that comprises a central pixel 21 and its surrounding pixels 23 as shown in FIG. 2. In the present embodiment, each of the image blocks 103 is a window 25 of size 3×3. Consequently, if the size of the image 101 is A×B, A×B image blocks would be generated by moving the window along each of the pixels 20.

Figure 3:
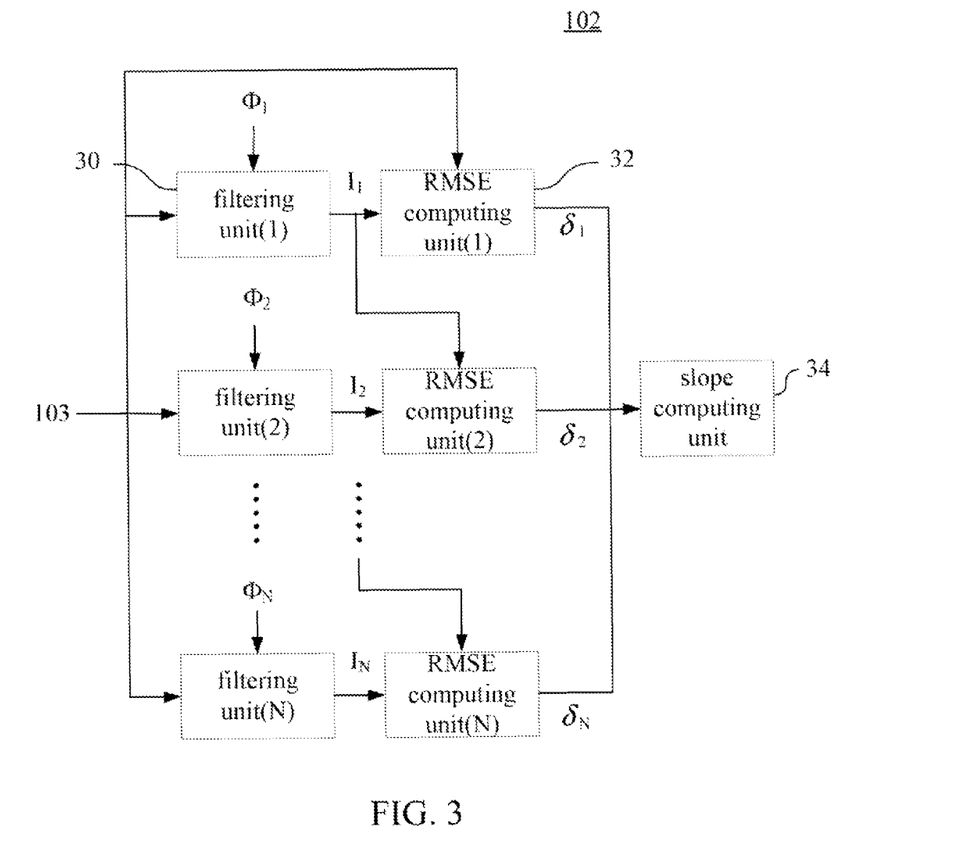
FIG. 3 is a block diagram of the image transforming module in an embodiment of the present invention.

FIG. 3 is a block diagram of the image transforming module 102 in an embodiment of the present invention. The image transforming module 102 comprises N filtering units 30, N RMSE computing units 32 and a slope computing unit 34.

The N filtering units 30 has N corresponding filtering parameters $\phi_1, \phi_2, \ldots, \phi_N$. Each of the filtering units 30 receives a specific image block (e.g. the window 25 depicted in FIG. 2) of the image blocks 103 as the input. The N filtering units 30 further filter the specific image block to generate N filtering results $I_1, I_2, \ldots, I_N$. In the present embodiment, the filtering parameters $\phi_1, \phi_2, \ldots, \phi_N$ gradually enhance the blurriness of the specific image block. In other words, the filtering result $I_1$ is blurrier than the original specific image block and the filter result $I_2$ is blurrier than the filtering result $I_1$. The rest filtering results can be deduced by analogy. Hence, the filtering result $I_N$ results in the blurriest image block.

In an embodiment, the M-th filtering result $I_M$ is generated according to the following equation:

$$I_M = I_0 * \phi_M, \text{ and } M = \{1, 2, \ldots, N\},$$

in which $I_0$ is the original image block, $\phi_M$ is the M-th filtering parameter and $I_M$ is the convolution result of $I_0$ and $\phi_M$. In an embodiment, the filtering parameters can be determined by the following two equations:

$$\phi_M(x,y) = (1/w)\exp(-(x^2+y^2)/2\sigma_M^2), \text{ and } x,y = \{1,2,\ldots,L\};$$

$$w = \Sigma_{x=1}^{L} \Sigma_{y=1}^{L} \exp(-((x-((L+1)/2))^2 + (y-((L+1)/2))^2)/2\sigma_M^2),$$

in which $\sigma_M$ is the standard variance of the M-th filtering parameter.

It is noted that in other embodiments, the filtering parameters can be generated by other methods to gradually enhance the blurriness of the specific image block.

The N RMSE computing units 32 compute N RMSE values $\delta_1, \delta_2, \ldots, \delta_N$ corresponding to the specific image block according to the filtering results. In the present embodiment, the M-th RMSE value is computed according to the M-th and the (M−1)-th filtering results. For example, the RMSE value $\delta_2$ is computed according to the second filtering result $I_2$ and the first filtering result $I_1$. The RMSE value $\delta_1$ is computed according to the first filtering result $I_1$ and the original specific image block.

In an embodiment, the M-th RMSE value is generated by the following equations:

$$\delta_M = (1/\sqrt{HW})\|I_{M-1} - I_M\|_2;$$

$$\|I_{M-1} - I_M\|_2 = \sqrt{\Sigma_{x=1}^{W} \Sigma_{y=1}^{H} (I_{M-1}(x,y) - I_M(x,y))^2},$$

in which H and W stands for the height and the width of the specific image block.

The slope computing unit 34 further computes a slope of an approximate line according to the RMSE values $\delta_1, \delta_2, \ldots, \delta_N$ as the blurriness value of the central pixel of the specific image block.

Figure 4:
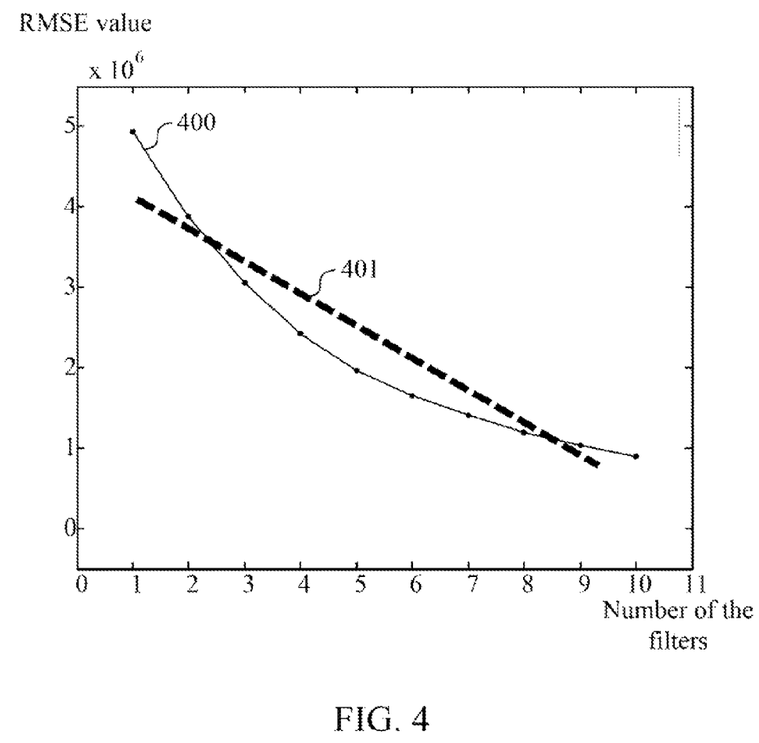
FIG. 4 is a diagram depicting the relation between the number of the filters corresponding to the RMSE computing units and the distributed RMSE values after the computation in an embodiment of the present invention.

FIG. 4 is a diagram depicting the relation between the number of the filters corresponding to the RMSE computing units 32 and the distributed RMSE values $\delta_1, \delta_2, \ldots, \delta_N$ after the computation.

The line sections 400 formed between each two of the neighboring RMSE values can be approximated by an approximate line 401. In an embodiment, the slope of the approximate line 401 can be generated by the following equation:

$$s = (-\Sigma_{M=1}^{N} M \Sigma_{M=1}^{N} \delta_M + N \Sigma_{M=1}^{N} M \delta_M) / (N \Sigma_{M=1}^{N} M^2 - (\Sigma_{M=1}^{N} M)^2).$$

Hence, after repeating the above steps, the blurriness values of the central pixels of all the image blocks 103 can be obtained.

After the blurriness values 105 of the pixels of the image 101 are computed by the image transforming module 102, the in-focus object detecting module 104 shown in FIG. 1 compares each of the blurriness values 105 with a threshold value. In an embodiment, the comparison process can be described by the following equations:

$$\Theta(x,y)=1, \text{ if } s(x,y)<T_2$$

$$\Theta(x,y)=0, \text{ otherwise}$$

When the blurriness value 105 is smaller than the threshold value $T_2$, the corresponding central pixel is labeled as a sharp pixel. When the blurriness value 105 is larger than the threshold value $T_2$, the corresponding central pixel is not labeled as a sharp pixel. It is noted that, the threshold value $T_2$ can be either a fixed value or an adaptive value. When the threshold value $T_2$ is an adaptive threshold value, it can be generated by the following equation:

$$T_2^M = \alpha T_2^{M-1} + (1-\alpha)/(HW) \Sigma_{x=1}^W \Sigma_{y=1}^H s(x,y),$$

in which $T_2^{M-1}$ is a threshold value used by a previous image block, $\Sigma_{x=1}^W \Sigma_{y=1}^H s(x,y)/HW$ is an average of the blurriness values of the pixels in the present image block and $\alpha$ is the weighting value.

For the still image 101, the in-focus object detecting module 104 can label the sharp pixels in the image 101 after the comparison process described above and further segment the pixels as a sharp object, which is also an in-focus object 107. According to different settings of the threshold value, the in-focus object 107 corresponding to different distances (depths) can be detected.

After detecting the in-focus object 107 of the image 101, the digital image processing module 106 performs a digital image processing on the in-focus object 107. In an embodiment, the digital image processing module 106 can perform a morphology processing, a median filtering processing or other kinds of image processing on the in-focus object 107 to generate the in-focus object processed result 109.

The image depth map constructing module 108 depicted in FIG. 1 can retrieve a reference depth table 111 to generate an image depth map 113 of the image 101 according to the blurriness value 105 of the specific image block and the reference depth table 111. The image depth map 113 is the depth information of the image 101 that stands for the distance of the object relative to the camera.

Figure 5:
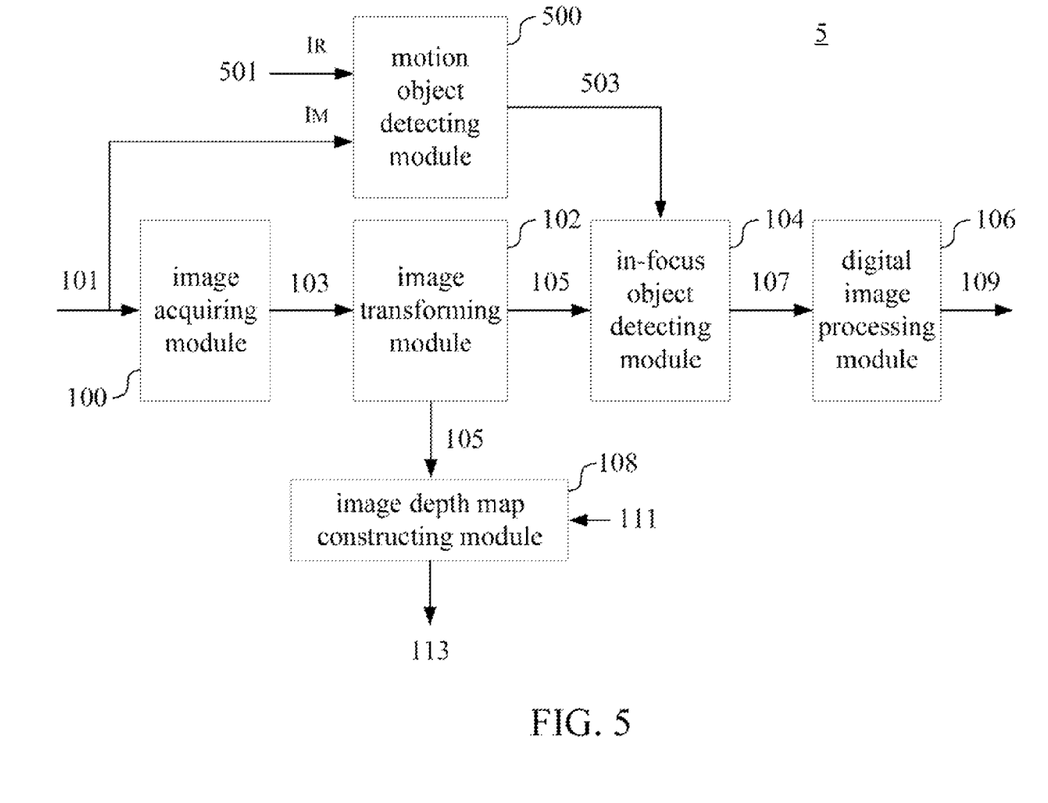
FIG. 5 is a diagram of a device for detecting objects of a motion image in an embodiment of the present invention.

FIG. 5 is a diagram of a device 5 for detecting objects of a motion image in an embodiment of the present invention. The device 5 has a similar structure with the device 1 depicted in FIG. 1 and comprises the image acquiring module 100, the image transforming module 102, the in-focus object detecting module 104, the image processing module 106 and the image depth map constructing module 108. However, in the present embodiment, the device 5 further comprises a motion object detecting module 500.

In the present embodiment, the image 101 acquired by the image acquiring module 100 is a motion image. The motion object detecting module 500 receives the image 101 and a reference motion image 501 and performs a comparison on them. In an embodiment, the reference motion image 501 is a previous motion image.

The motion object detecting module 500 computes the sum of the squared differences of each of the corresponding pixels of the image 101 and the reference motion image 501 first. In the present embodiment, the sum of the squared differences is generated according to the following equation:

$$\epsilon_M^2(x,y) = \|I_R(x,y) - I_M(x,y)\|^2,$$

in which $I_R$ is the reference motion image 501 and $I_M$ is the image 101.

After generating the sum of the squared differences of all the pixels, the motion object detecting module 500 further performs comparisons and determinations on the pixels according to the following equations:

$$\Omega(x,y)=1, \text{ if } \epsilon_M^2(x,y)>T_1;$$

$$\Omega(x,y)=0, \text{ otherwise}.$$

Hence, when the sum of the squared differences is larger than the threshold value $T_1$, the central pixel is labeled as a motion pixel because the difference between the central pixel of the image block 103 and the corresponding pixel in the reference motion image in a previous time is large. After performing the above process on all the pixels of the image 101, a motion object 503 in the image 101 can be detected.

Therefore, after the image transforming module 102 computes the blurriness values 105 of the pixels by the method described in the previous embodiment, the in-focus object detecting module 104 generates a function of the in-focus object 107 not only according to the function $\Theta(x, y)$ representing the pixels in the sharp object that is generated based on the comparisons between the blurriness values 105 and the threshold value, but also according to the function $\Omega(x, y)$ of the motion object 503:

$$R(x,y)=\Omega(x,y)\cdot\Theta(x,y)$$

After detecting the in-focus object 107, the digital image processing module 106 further performs the subsequent image processing procedures. Hence, the device 5 in the present embodiment can detect the in-focus object in the motion image.

The device for detecting objects of the present invention can establish the reference data of the depth of the image by computing the blurriness values to further detect the objects on the specific distance accordingly. Also, the device can take the reference depth table into account to generate the depth map of the image. The computation of the blurriness values of the pixels is not affected by the deviation of the light source. When a camera takes a plurality of photos successively and the light source of the environment suddenly turns bright or turns dark, the shape of the object detected by the conventional devices would deform severely and the computation process has to keep adjusting the threshold value. As a result, the detecting process is time-consuming and the detecting result is not accurate. On the contrast, the device in the present invention can perform analysis in accordance to the degree of change of multiple value differences. The effect caused by the rapid-changing light source can be avoided even without adjusting the threshold value.

Figure 6:
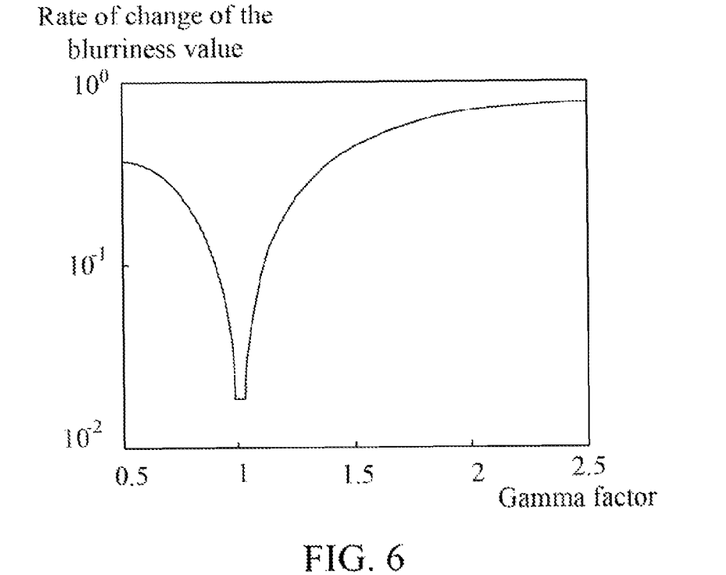
FIG. 6 is a diagram depicting the relation between the gamma factor representing the brightness and the rate of change of the blurriness value computed according to the method of the present invention in an embodiment of the present invention.

FIG. 6 is a diagram depicting the relation between the gamma factor representing the brightness and the rate of change of the blurriness value computed according to the method of the present invention in an embodiment of the present invention. FIG. 6 clearly shows that the rate of change is smaller than 0.8 during the interval that the gamma factor changes from 0.5 to 2.5 (i.e. under different conditions of light source). The computation result is highly stable under different light source conditions.

Figure 7:
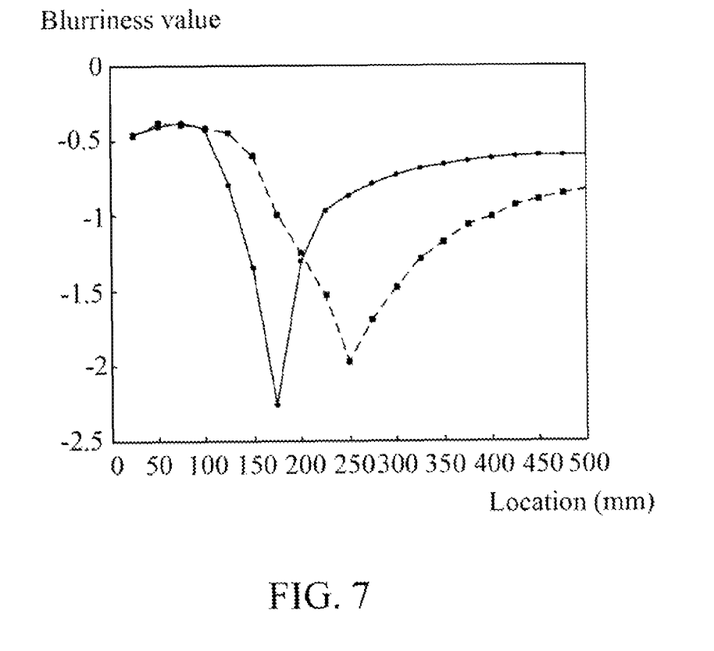
FIG. 7 is a diagram depicting the relation between the location of the object and the blurriness value in an embodiment of the present invention.

FIG. 7 is a diagram depicting the relation between the location of the object and the blurriness value in an embodiment of the present invention. In the present embodiment, the line sections formed according to the round points stand for the condition when the focal length is 175 mm. The line sections formed according to the square points stand for the condition when the focal length is 250 mm.

As shown in FIG. 7, different blurriness values are obtained under different conditions of depth, in which the minimal blurriness value corresponds to the focal length of the camera. When the object is located at the distance of the focal length, the blurriness value is the minimum. The blurriness value of the object gradually becomes larger when the distance of the object becomes larger as well. Accordingly, the method of the present invention can efficiently establish the relation between the blurriness value and the depth.

Figure 8:
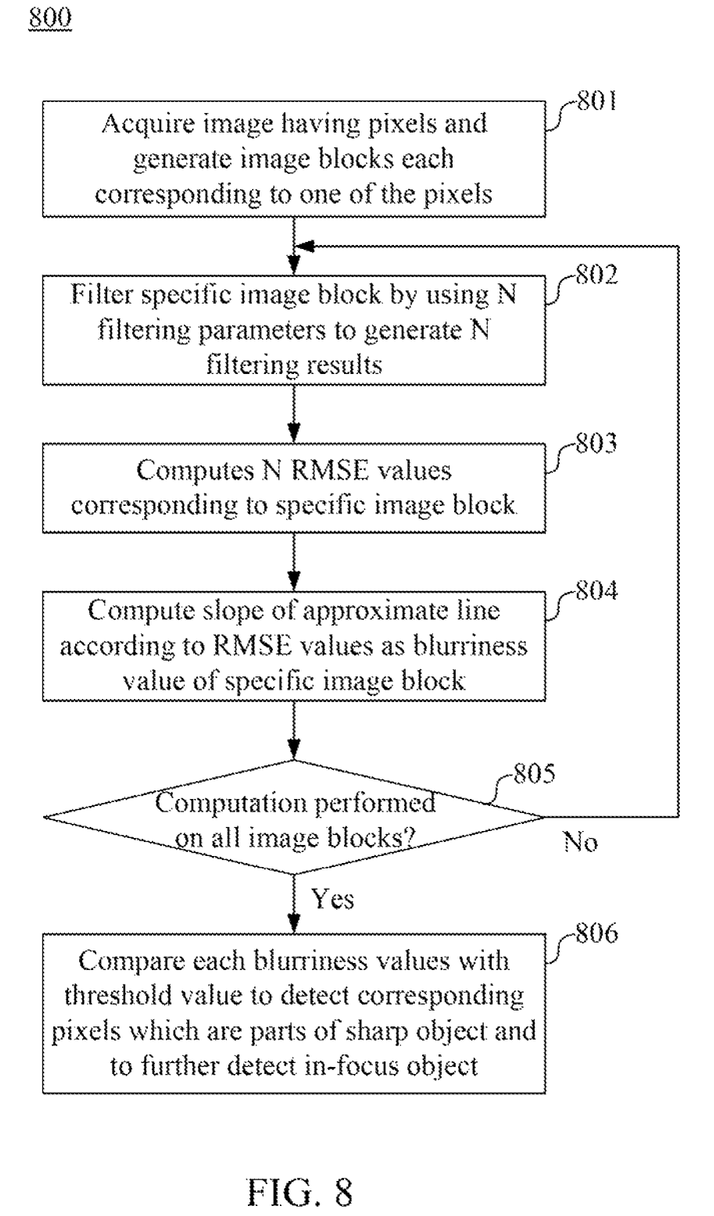
FIG. 8 is a flow chart of a method for detecting objects in an embodiment of the present invention.

FIG. 8 is a flow chart of a method 800 for detecting objects in an embodiment of the present invention. The method 800 can be used in the device 1 depicted in FIG. 1 or the device 5 for detecting the object in the motion image depicted in FIG. 5. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The method 800 comprises the steps as outlined below.

In step 801, the image acquiring module 100 acquires an image having pixels and generates a plurality of image blocks 103, in which each of the image blocks 103 corresponds to one of the pixels.

In step 802, the image transforming module 102 filters a specific image block of the image blocks 103 by using N filtering parameters to generate N filtering results, in which the N filtering parameters gradually enhance the blurriness of the specific image block;

In step 803, the image transforming module 102 computes N root mean square error (RMSE) values, in which the M-th RMSE value is computed according to the M-th and the (M−1)-th filtering results.

In step 804, the image transforming module 102 computes a slope of an approximate line according to the RMSE values as the blurriness value 105 of the specific image block.

In step 805, whether the computation is performed on all the image blocks is determined. If the computation is not performed on all the image blocks yet, the flow returns to step 802.

When the computation is performed on all the image blocks, the in-focus object detecting module 104 compares each of the blurriness values 105 with a threshold value to detect corresponding pixels which are parts of a sharp object and to further detect an in-focus object 107 in step 806.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for detecting objects used in a device for detecting objects, wherein the method comprises:
    acquiring an image having pixels;
    generating a plurality of image blocks, in which each of the image blocks corresponds to one of the pixels;
    filtering a specific image block of the image blocks by using N filtering parameters to generate N filtering results, in which the N filtering parameters gradually enhance the blurriness of the specific image block, wherein N is an integer greater than 1;
    computing N root mean square error (RMSE.) values, in which M is an integer from 2 to N, the first RMSE value is computed according to the first filtering result and the specific image block with no filtering, and the M-th RMSE value is computed according to the M-th and the (M−1)-th filtering results;
    computing a slope of an approximate line according to the RMSE values as the blurriness value of the specific image block;
    repeating the above steps to generate the blurriness values of all of the image blocks correspond to the pixels: and
    comparing each of the blurriness values with a threshold value to detect corresponding pixels which are parts of a sharp object and further detect an in-focus object.

2. The method of claim 1, wherein the slope is computed according to the RMSE values by using a least squares approximation method.

3. The method of claim 1, wherein the threshold value is an adaptive threshold value that is generated according to a previous threshold value and an average blurriness value of the pixels of the specific image blocks.

4. The method of claim 1, further comprising a step of determining whether the image is a motion image, when the image is the motion image, the method further comprises the steps of:
    comparing the motion image with a reference motion image to detect a motion object; and
    detecting the in-focus object according to the sharp object and the motion object.

5. The method of claim 4, wherein the reference motion image is a previous motion image.

6. The method of claim 1, further comprising a step of retrieving a reference depth table to generate an image depth map of the image according to the blurriness value of the specific image block and the reference depth table.

7. The method of claim 1, further comprising a step of performing a digital image processing on the in-focus object, wherein the digital image processing comprises a morphology processing and a median filtering processing.

8. A device for detecting objects, wherein the device comprises:
    an image acquiring circuit, acquiring an image having pixels and generating a plurality of image blocks, in which each of the image blocks corresponds to one of the pixels;
    an image transforming circuit comprising:
        N filtering circuits having N corresponding filtering parameters for filtering a specific image block of the image blocks to generate N filtering results, in which the N filtering parameters gradually enhance the blurriness of the specific image block, wherein N is an integer greater than 1;
        N RMSE computing circuits, computing N RMSE values, in which M is an integer from 2 to N, the first RMSE value is computed according to the first filtering result and the specific image block with no filtering, and the M-th RMSE value is computed according to the M-th and the (M−1)-th filtering results; and
        a slope computing circuit, computing a slope of an approximate line according to the RMSE values as the blurriness value of the specific image block; and
    an in-focus object detecting circuit, comparing each of the blurriness values with a threshold value to detect corresponding pixels which are parts of a sharp object and further detect an in-focus object.

9. The device of claim 8, wherein slope computing circuit computes the slope according to the RMSE values by using a least squares approximation method.

10. The device of claim 8, wherein the threshold value is an adaptive threshold value that is generated according to a previous threshold value and an average blurriness value of the pixels of the specific image blocks.

11. The device of claim 8, further comprising a motion object detecting circuit to compare the motion image with a reference motion image to detect a motion object and the in-focus object detecting circuit further detects the in-focus object according to the sharp object and the motion object.

12. The device of claim 11, wherein the reference motion image is a previous motion image.

13. The device of claim 8, further comprising an image depth map constructing circuit, retrieving a reference depth table to generate an image depth map of the image according to the blurriness value of the specific image block and the reference depth table.

14. The device of claim 8, further comprising a digital image processing circuit, performing a digital image processing on the in-focus object, wherein the digital image processing comprises a morphology processing and a median filtering processing.

15. A non-transitory computer readable storage medium to store a computer program to execute a method for detecting objects used in a device for detecting objects, wherein the method comprises:
   acquiring an image having pixels;
   generating a plurality of image blocks, in which each of the image blocks corresponds to one of the pixels;
   filtering, a specific image block of the image blocks by using N filtering parameters to generate N filtering results, in which the N filtering parameters gradually enhance the blurriness of the specific image block, wherein N is an integer greater than 1;
   computing N root mean square error (RMSE) values, in which M is an integer from 2 to N, the first RMSE value is computed according to the first filtering result and the specific image block with no filtering, and the M-th RMSE value is computed according, to the M-th and the (M−1)-th filtering results;
   computing a slope of an approximate line according to the RMSE values as the blurriness value of the specific image block;
   repeating the above steps to generate the blurriness values of all of the image blocks correspond to the pixels; and
   comparing each of the blurriness values with a threshold value to detect corresponding pixels which are parts of a sharp object and further detect an in-focus object.

16. The non-transitory computer readable storage medium of claim 15, wherein the slope is computed according to the RMSE values by using a least squares approximation method.

17. The non-transitory computer readable storage medium of claim 15, wherein the threshold value is an adaptive threshold value that is generated according to a previous threshold value and an average blurriness value of the pixels of the specific image blocks.

18. The non-transitory computer readable storage medium of claim 15, wherein the method further comprises a step of determining whether the image is a motion image when the image is the motion image, the method further comprises the steps of:
   comparing the motion image with a reference motion image to detect a motion object; and
   detecting the in-focus object according to the sharp object and the motion object.

19. The non-transitory computer readable storage medium of claim 18, wherein the reference motion image is a previous motion image.

20. The non-transitory computer readable storage medium of claim 15, wherein the method further comprises a step of retrieving a reference depth table to generate an image depth map of the image according to the blurriness value of the specific image block and the reference depth table.

21. The non-transitory computer readable storage medium of claim 15, wherein the method further comprises a step of performing a digital image processing on the in-focus object, wherein the digital image processing comprises a morphology processing and a median filtering processing.

* * * * *